United States Patent [19]
> Bernstein et al.

[11] 3,832,613
[45] Aug. 27, 1974

[54] SEWING MACHINE MOTOR AND CONTROL CIRCUIT

[75] Inventors: Benjamin T. Bernstein, Highland Park, Ill.; James R. Crawshaw, Trotwood; Morris H. McCurry, Dayton, both of Ohio

[73] Assignee: Union Specially Machine Company, Chicago, Ill.

[22] Filed: May 14, 1973

[21] Appl. No.: 359,870

[52] U.S. Cl.................. 318/269, 318/439, 318/466
[51] Int. Cl. ........................................ H02k 29/00
[58] Field of Search........... 318/138, 254, 264, 265, 318/269, 272, 275, 439, 466, 467, 696

[56] References Cited
UNITED STATES PATENTS

| | | | |
|---|---|---|---|
| 3,573,581 | 4/1971 | Dutko et al..................... | 318/466 X |
| 3,597,672 | 8/1971 | Seesselberg et al................ | 318/269 |
| 3,714,532 | 1/1973 | McCurry......................... | 318/439 X |
| 3,715,642 | 2/1973 | Walter.............................. | 318/269 |

Primary Examiner—Robert K. Schaefer
Assistant Examiner—W. E. Duncanson, Jr.
Attorney, Agent, or Firm—Biebel, French & Bugg

[57] ABSTRACT

A solid state sewing machine drive system includes a brushless direct current motor, the speed of which is set and maintained by controlling the width of the field energization pulses. The motor is accelerated and maintained at a selected speed while operating in a closed loop mode, decelerated quickly to a stop by means of a dynamic brake, driven in an open loop stepping mode to a selected angular position, and then magnetically held in that position. Alternatively the motor may be decelerated to a predetermined low speed near stop by a dynamic brake and then driven in an open loop stepping mode to a predetermined angular position where it is held magnetically in that position. The motor includes fixed sensing inductors which sense the proximity of metallic segments rotating with the permanent magnet motor rotor for providing motor commutation signals and signals representing one possible stopping position of the rotor, and other sensing inductors which may be rotated relative to the motor field windings for providing signals representing another, angular positionable stopping position of the rotor. The circuit for supplying energization pulses to the motor field when operated in the open loop mode is provided with information regarding actual rotor position while the motor is decelerated so that when the stepping mode is actually begun, the rotor will continue to rotate in the same direction and will be synchronized with the rotating magnetic field.

14 Claims, 35 Drawing Figures

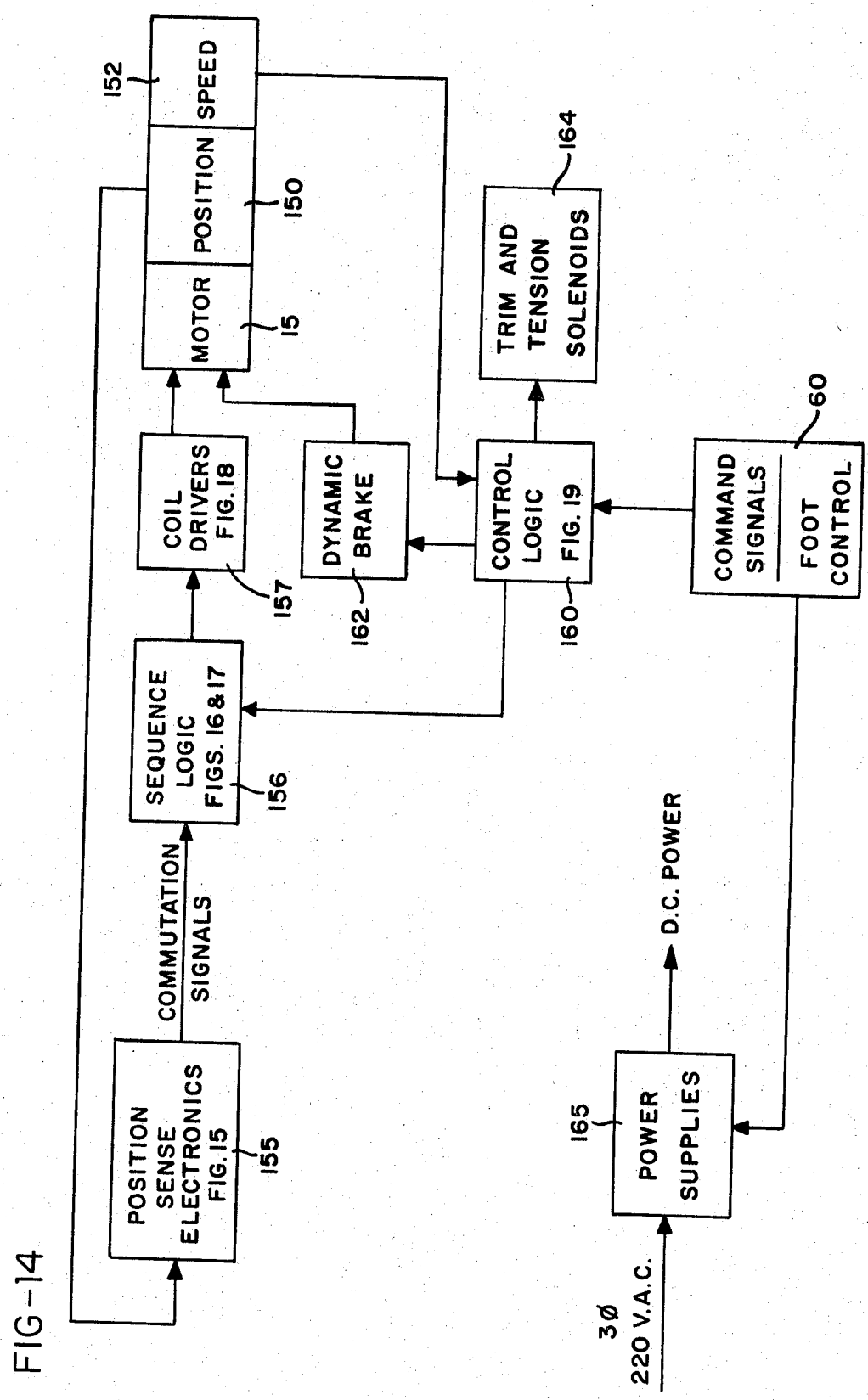

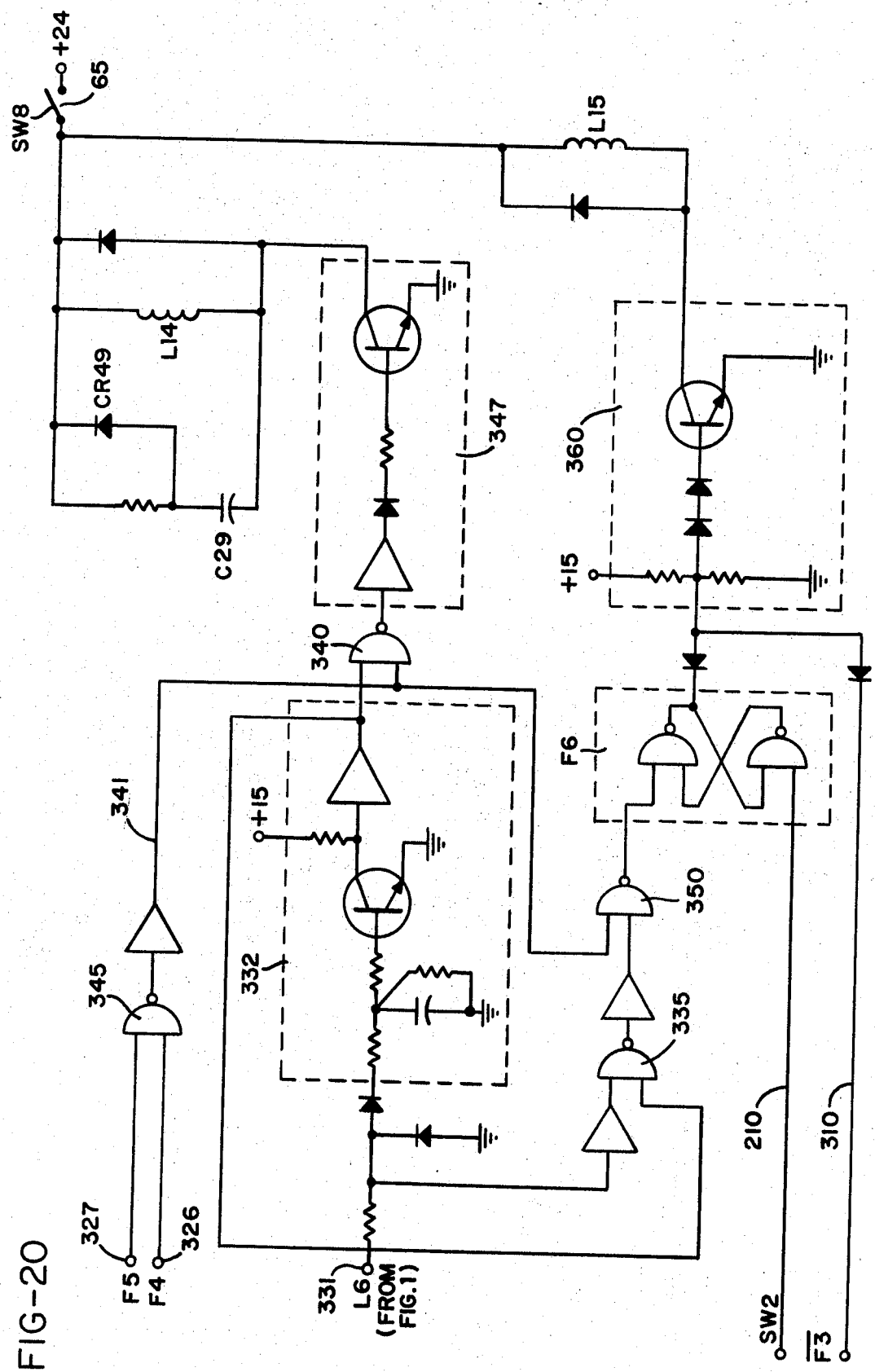

SEWING MACHINE MOTOR AND CONTROL CIRCUIT

BACKGROUND OF THE INVENTION

The prior art shows industrial sewing machines driven by induction motors containing a flywheel and a clutch-brake mechanism. Clutch engagement transfers the kinetic energy of the flywheel to an output shaft connected to the sewing machine mainshaft by means of pulleys and a belt to give rapid acceleration. The sewing machine is brought to a stop by means of a friction brake upon disengagement of the clutch. U.S. Pat. Nos. 3,505,548 and 3,516,526 disclose electronic circuits for controlling this type of sewing machine drive.

One improvement over the above described prior art system is disclosed in U.S. Pat. No. 3,597,672 wherein a direct current motor is connected directly to the main shaft of the sewing machine. The motor is provided with appropriate control circuitry for driving the sewing machine at predetermined speeds and for decelerating the sewing machine by means of a dynamic brake. The motor control circuitry of the patent includes drive and brake gate controlled rectifiers (SCRs) which are selectively triggered into conduction for supplying driving current to or for causing dynamic braking of the motor.

U.S. Pat. No. 3,544,874 discloses a circuit for inhibiting the triggering of one gate controlled rectifier until the other gate controlled rectifier is turned off to prevent simultaneous triggering of both the drive and brake rectifiers in the event that the gating signals to these rectifiers are improperly sequenced or spaced.

U.S. Pat. 3,573,581 discloses a solid state gating and memory for use with the direct current motor to position the sewing machine at selected needle positions.

SUMMARY OF THE INVENTION

This invention relates to a novel motor for use with sewing machines and to a sewing machine control system in which the motor may be accelerated to one of a plurality of selected speeds, maintained at the selected speed, decelerated quickly to a stop, driven as a stepping motor to a selected angular position and then held in that position. Alternatively the motor may be decelerated to a predetermined low speed near stop by a dynamic brake and then driven in an open loop stepping mode to a predetermined angular position where it is held magnetically in that position. In a sewing machine, the selected angular position of the motor, when stopped, may correspond to either needle down (for repositioning the material being sewn) or needle up (for removal of the material from the machine). As the motor rotates from the needle down to the needle up position, a cut cycle may be initiated to cut the thread at the proper location.

A sewing machine constructed according to this invention includes a brushless direct current motor similar to that described in U.S. Pat. No. 3,714,532 where the commutation of current through the motor field windings is controlled by the voltage level across a plurality of sensing inductors mounted to detect the presence of a metallic segment which rotates with the motor rotor; accordingly, no commutating brushes are required.

The sensing inductors are supplied with a high frequency current from a fixed frequency oscillator, and changes in the resonant frequency in the inductors due to the proximity of the metallic segment causes a voltage across the inductors to change sharply. The voltage outputs from complementary inductors are compared simultaneously by a differential amplifier with the output of the amplifier being substantially independent of the frequency or magnitude of the oscillator output.

The motor may be operated at a speed (one of four preselected speeds in the present invention) selected by an operator actuated foot pedal. When the operator initially depresses the pedal from the neutral position to one of four detented positions, the motor will accelerate and run at the selected speed as a brushless direct current motor. A feedback circuit is provided to maintain the motor speed constant under varying load conditions. The speed of the motor is regulated by varying the width of the pulses energizing the field windings.

When the operator allows the foot treadle to return to its neutral position, the motor will decelerate quickly due to the action of a dynamic brake. After the motor stops, or alternatively, when the motor speed decreases below a predetermined slow speed, the dynamic brake is removed and the motor will be driven to the needle down position as a stepping motor operating in an open loop stepping mode. The rate at which the motor rotates in this mode is determined by an oscillator and is sufficiently slow to allow the motor to stop within plus or minus 2° of the predetermined position. The needle down position is determined by a sensing coil or inductor in the motor which senses the presence of a metallic segment rotating with the motor rotor. In the needle down position, the operator may turn the material around the needle, as required.

If the operator heels the treadle (moves it backward from the neutral position), the control circuit will cause the motor to move from the needle down position to the needle up position. The actual rotor position corresponding to the needle up position is adjustable in 15° increments and is determined by the relationship between a metallic segment which rotates with the motor rotor and an inductor mounted on a plate which may be rotated in 15° increments with respect to the motor field windings.

The motor rotor is magnetically held in either the needle down or the needle up position by magnetic detenting (due to the relationship between the permanent magnet of the rotor and the field lamination which results in the least reluctance) and static friction of the sewing machine. Thus, the brushless direct current motor rotor may be accurately positioned by stepping the motor relatively slowly to the selected position, and is then held at that position.

When moving from the needle down position to the needle up position, another metallic segment will pass in proximity to a sensing coil to initiate a cut cycle. The cut cycle causes cutter and tension solenoids to be energized at the correct angular position of the motor rotor so that when the final position of the rotor is reached, the thread will be cut and pulled away from the material with the proper amount of thread tail extending from the needle. In the needle up position, the operator may change the position of the needle in the material for another sewing operation on the material or remove the material from the machine.

The operator may also heel the treadle momentarily while the machine is running and thereafter allow the treadle to return to the neutral position. The control circuit will cause the rotor to go to the needle up position without stopping but will require the rotor first to pass through the needle down position as the cut cycle operation may only be accomplished when the rotor moves from the needle down position to the needle up position.

The brushless direct current motor is so constructed that the resistance of the field windings is extremely low, in the order of 0.15 ohm, and therefore the power dissipated in the motor is significantly less than in other direct current motors used on sewing machines resulting in low motor temperature for operator safety.

It is an object of this invention to provide an improved drive system for sewing machines including a brushless direct current motor having a plurality of metallic segments mounted for rotation with the motor rotor, the metallic segments cooperating with sensing inductors to provide signals for motor commutation and for identifying selected stopping positions of the motor rotor; and to provide a novel brushless direct current motor including a plurality of metallic segments, one cooperating with a sensing inductor which is fixed relative to the motor field windings for positioning the motor rotor at a fixed stopping position and another metallic segment cooperating with a sensing inductor which may be selectively positioned with respect to the motor windings for positioning the motor rotor at an adjustable stopping position.

It is a further object of this invention to provide a sewing machine motor control system utilizing a brushless direct current motor which is operated in a closed loop running mode to maintain the motor at a preselected speed, decelerated quickly to a stop, or alternatively to a predetermined slow speed by means of a dynamic brake, rotated slowly in an open loop stepping mode to one of two preselected positions, either with the sewing machine needle down, or with the needle up, and thereafter stopped and held at the preselected position.

It is also an object of this invention to provide a motor control circuit of the type described including a stepping counter which is preset with information regarding actual rotor position immediately prior to operating the motor in the stepping mode.

Other objects and advantages of the invention will be apparent from the following description, the accompanying drawings and the appended claims.

BRIEF DESCRIPTION OF THE DRAWINGS

FIG. 14 is a block diagram of the motor control system of this invention;

FIG. 20 is an electrical schematic diagram of the tension and cutting solenoid circuit;

DESCRIPTION OF THE PREFERRED EMBODIMENTS

Figure 1:
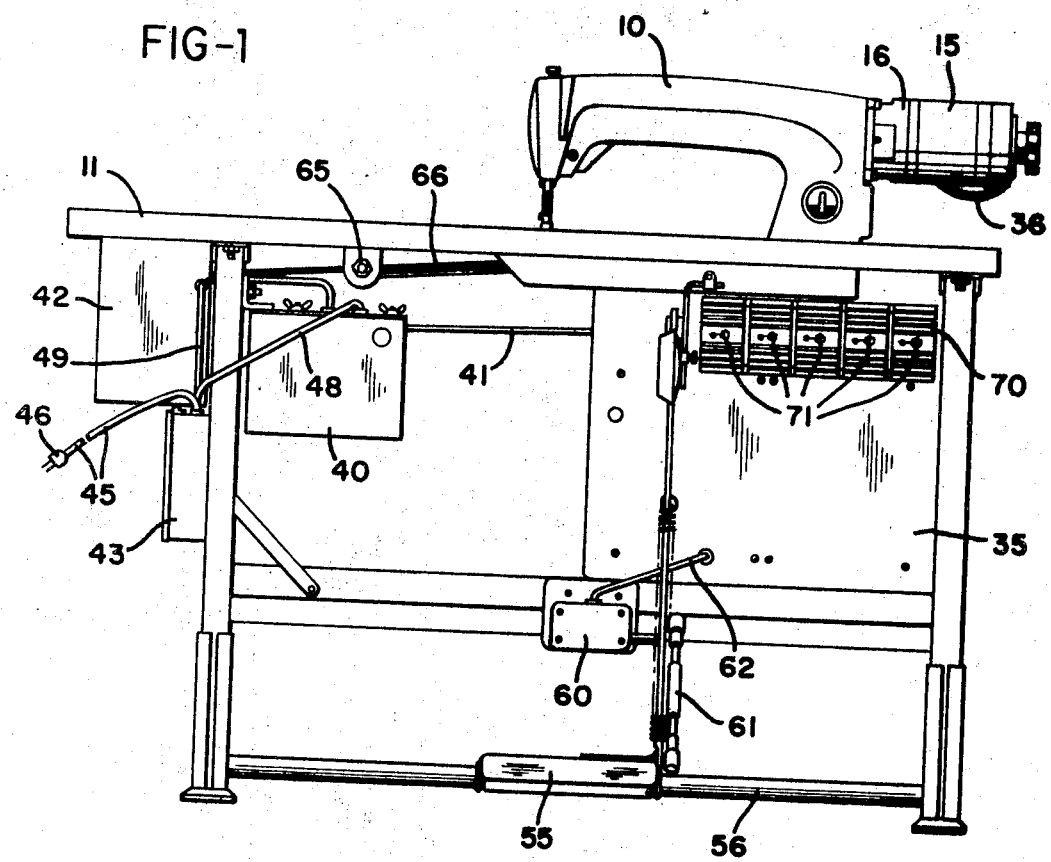
FIG. 1 is a front elevational view of a sewing machine incorporating a motor and control circuit constructed according to this invention.
Figure 2:
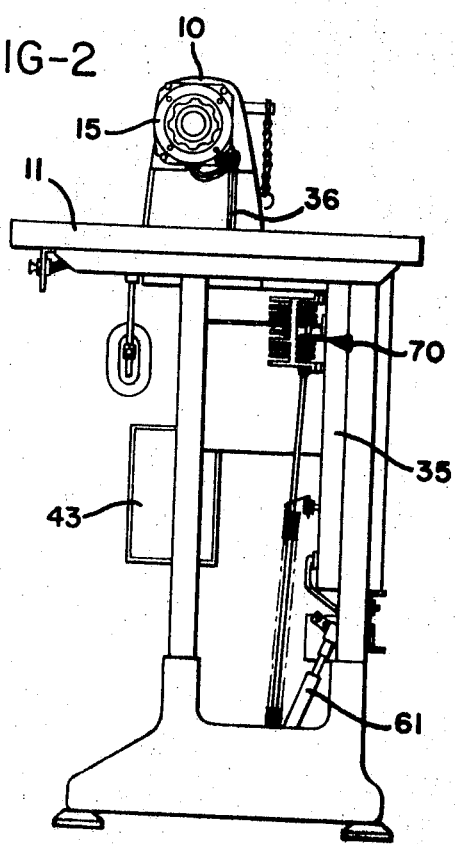
FIG. 2 is an end view of the sewing machine and motor of FIG. 1.

Referring now to the drawings which show the preferred embodiments of the invention, and particularly to FIGS. 1 and 2, a sewing machine 10 is shown mounted on a table 11. The sewing machine is powered by a motor 15 secured to the frame of a sewing machine 10 by a bracket 16. In the embodiment shown in FIGS. 1 and 5, the motor 15 is connected in direct drive relation to the sewing machine 10. The shaft 17 of the motor (FIG. 5) is coupled directly to a main shaft 18 of the sewing machine with a bobbin thread winder puller 20 attached to the coupling 21.

Figure 4:
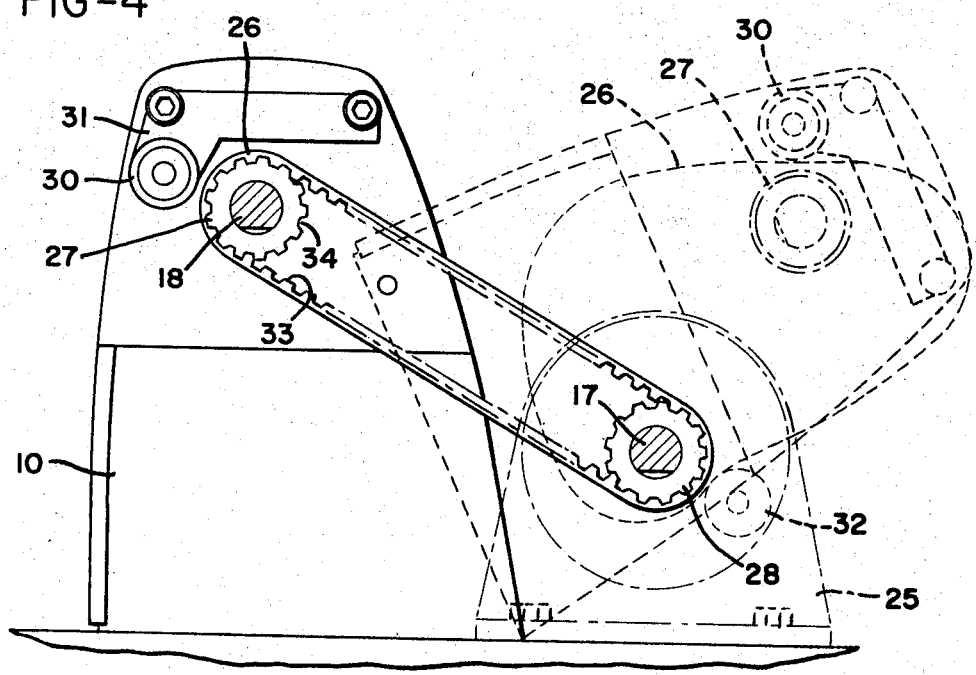
FIG. 4 is an end view of an alternative arrangement of mounting the motor relative to the sewing machine.

Alternatively, the motor 15 may be mounted to the table top 11 by a bracket 25, as shown in FIG. 4. In this embodiment, the shaft 17 of the motor is connected to the drive shaft 18 of the sewing machine by a timing belt 26 through timing belt pulley 27 attached to the shaft 18 and pulley 28 attached to the motor shaft 17. A roller 30 is mounted next to the pulley 27 on a bracket 31 which is mounted on the sewing machine housing, and a roller 32 is mounted next to the pulley 28 on the bracket 25 in such a way as to prevent the teeth 33 of the belt 26 from becoming disengaged from mating grooves 34 in the pulleys 27 and 28 when the sewing machine housing is tilted back to the dashed position shown in FIG. 5.

Referring again to FIG. 1, the sewing machine includes an electronic control box 35 mounted below the table 11 containing a control circuit connected to the motor by a cable 36, and to a power supply 40 by cable 41. Also mounted beneath the table is an auxiliary power supply 42 and a main switch and fuse box 43. Power from a conventional source of power is provided by a cable 45 which terminates in a plug 46. Power from the switch box is routed to the power supply 40 through cable 48 and to the auxiliary power supply 42 by cable 49.

A conventional treadle 55 is pivotally mounted on a rod 56 near the floor and is connected to a control switch enclosure 60 by means of a Pittman rod 61. The control switch enclosure 60 is connected to control circuit 35 by means of a cable 62. The control switch enclosure contains six switches, four of which are selectively actuated when the operator rotates the treadle forward for driving the sewing machine at one of four programmable speeds, a fifth being actuated to change the power supply output voltage, and the sixth switch being actuated when the operator "heels" the treadle to actuate the "needle up" cycle.

Also mounted beneath the table is a "cut cycle defeat" switch 65 connected to the control circuit box 35 by cable 66. The control box 35 includes a heat sink 70 on which are mounted five Zener diodes 71, the function of which will be described later.

Figure 5:
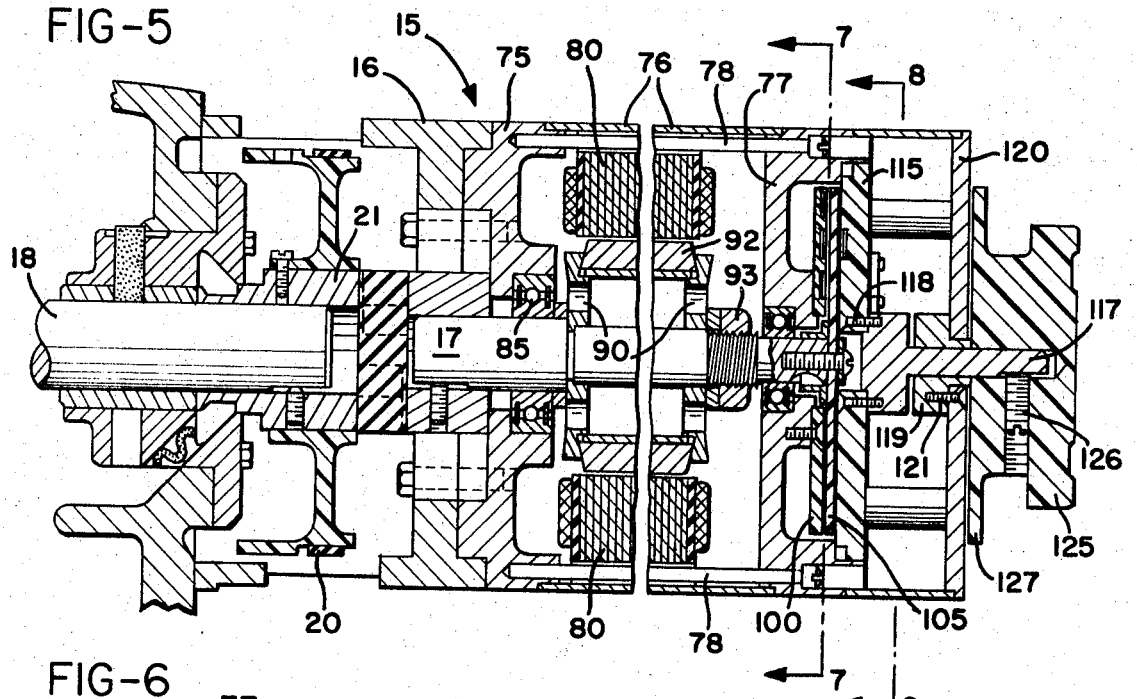
FIG. 5 is a cross-sectional view of a brushless direct current motor used to drive the sewing machine of FIG. 1.

Reference is now made to FIG. 5 which is a cross sectional view of brushless direct current motor 15. The motor includes a frame having an end enclosure 75, a cylindrical housing 76, and an inside enclosure 77 all secured together by circumferentially spaced bolts 78. The bolts 78 also secure the stator windings 80 within the motor frame.

One end of the motor shaft 17 is journalled in a ball bearing assembly 85, while the other end is journalled by ball bearing assembly 86. A shell 90 is mounted for rotation with the motor shaft 17 and carries with it a plurality (typically 12) permanent magnets 92. The shell is secured to the shaft by means of a nut 93.

The motor shown in FIG. 5 is what is known in the art as a brushless direct current motor, and commutation of the motor field windings is done electronically by means of fixed sensing coils which sense the presence of metallic members mounted for rotation with the motor shaft.

Figure 9:
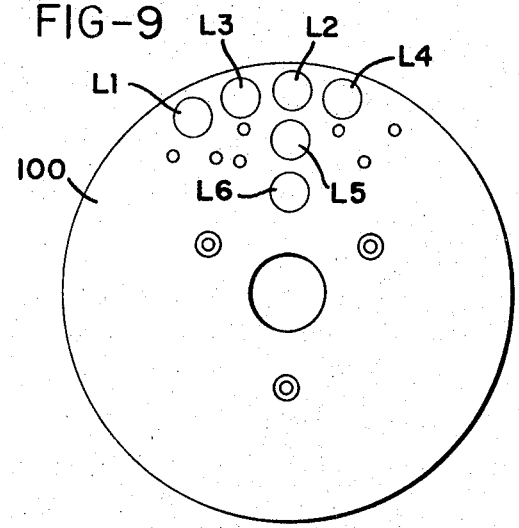
FIG. 9 is a view of a disc mounting the fixed position sensing coils.

A non-metallic disc 100, (FIGS. 6, 7 and 9) containing six position sensing coils, coils L1, L2, L3, and L4 for motor commutation, coil L5 for the needle down position, and coil L6 for the cut cycle function, is secured to the inside enclosure 77 by three screws 101.

Figure 10:
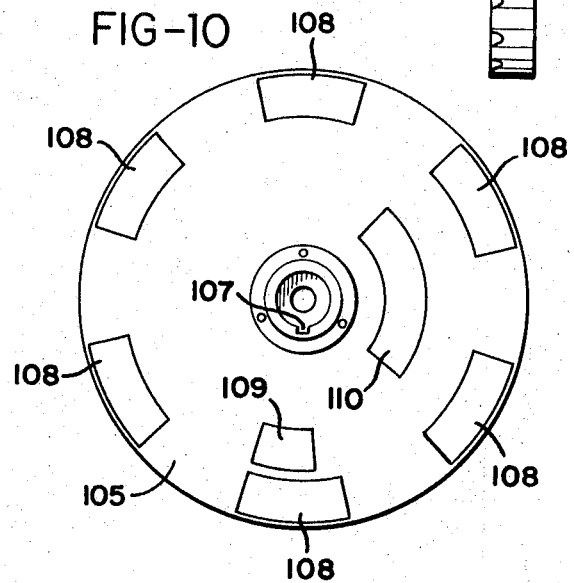
FIG. 10 is a view of one side of a position indicating disc mounted to rotate with the armature of the motor which includes metallic segments which cooperate with the position indicating coils shown in FIG. 9.
Figure 11:
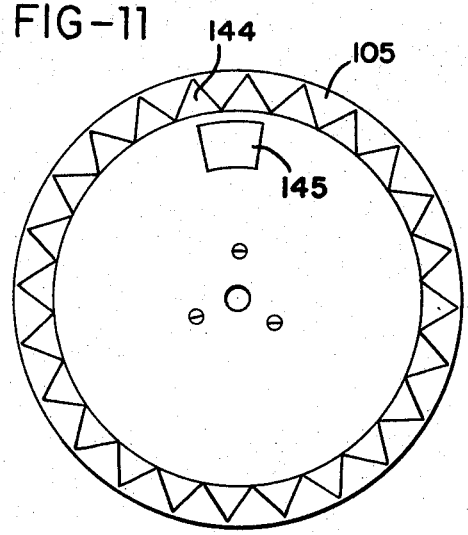
FIG. 11 is a view of the other side of the position indicating disc showing the metallic segments which cooperate with the rotatable position indicating coil of FIG. 12.
Figure 12:
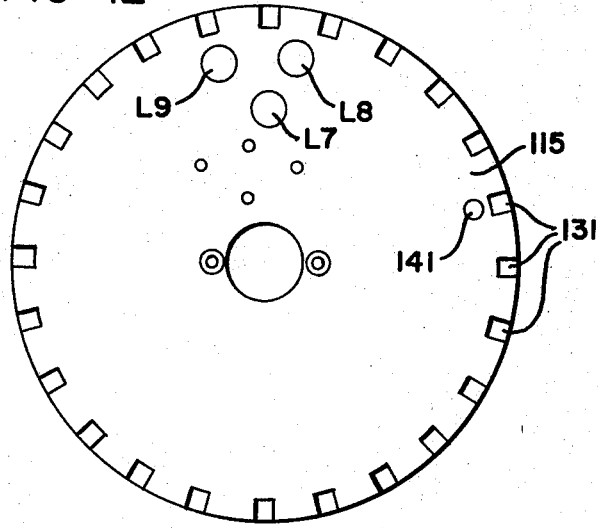
FIG. 12 is a view of position sensing coils mounted in a disc rotatably supported within the motor and notches around the periphery of the disc used in locating the disc in 15° increments.

A printed circuit disc 105 is mounted for rotation on one end of the motor shaft 17 adjacent the non-metallic disc 100 by screw 106. As shown in FIG. 10, the disc 105 includes a keyway 107 to provide proper orientation of the disc with respect to the motor rotor. On the side facing non-metallic disc 100 are six metallic segments 108 which function to effect motor commutation; metallic segment 109 identifies the needle down position; and metallic segment 110 identifies the cut cycle position.

Non-metallic disc 115 (FIGS. 5, 8, 12 and 13) contains three position sensing coils, a first coil L7 for use in the "needle up" position function, and two coils L8 and L9 for use in a motor speed control circuit. The disc 115 is secured to the large diameter end of a two diameter shaft 117 by means of screws 118 and is positioned adjacent the rotating printed circuit disc 105.

Shaft 117 is journalled in a plain bearing 119 carried on end enclosure 120 by screws 121. The shaft is attached to a needle up position selector knob 125 by a set screw 126. As viewed in FIG. 3, the knob 125 includes a ring 127 having markings thereon from "0" to "23" spaced in 15° increments. A vertical line 128 is provided on the end enclosure 120 to identify the increment selected.

Figure 6:
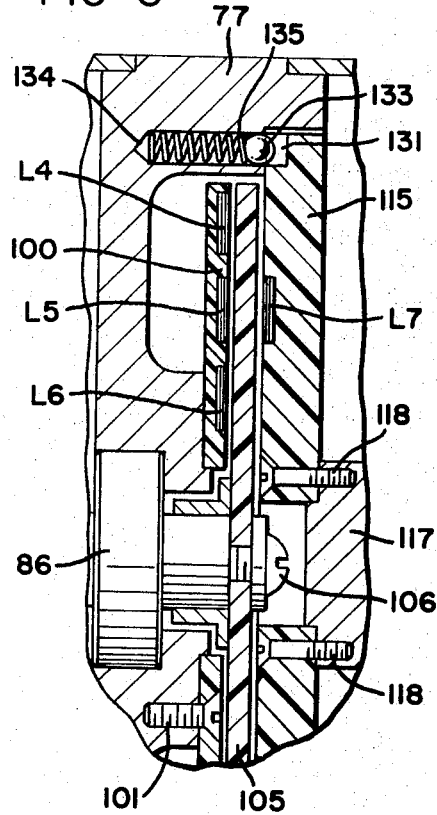
FIG. 6 is an enlarged cross sectional view of a portion of the motor of FIG. 5 showing particularly the position sensing coils and position indicating disc.
Figure 7:
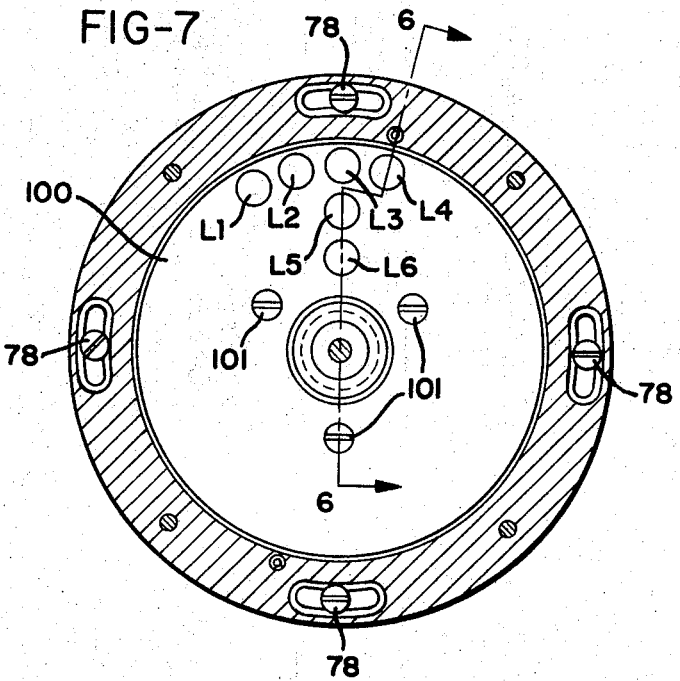
FIG. 7 is a cross sectional view taken along line 7—7 in FIG. 5 showing the fixed position sensing coils.
Figure 8:
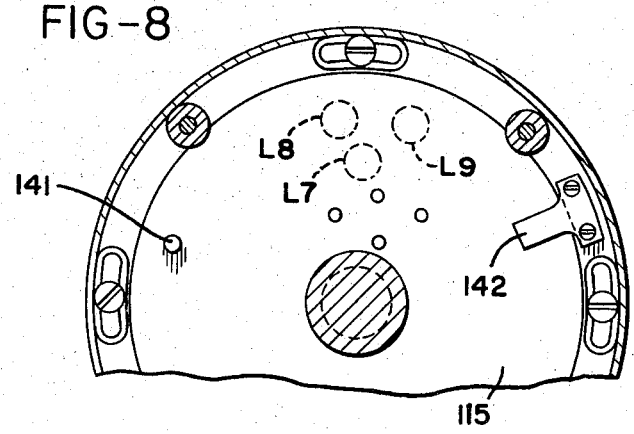
FIG. 8 is a view taken along line 8—8 in FIG. 5 showing the rotatable position sensing coils.
Figure 13:
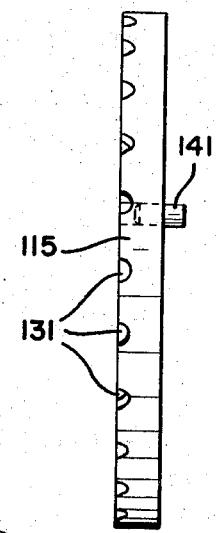
FIG. 13 is a side view of the disc of FIG. 12, also showing the notches used for positioning the disc.

The non-metallic disc 115 includes 24 circumferentially spaced notches 131 (FIGS. 12 and 13) at its periphery into which fit two steel balls 133 (one of which is shown in FIG. 6) spaced 180° apart within openings 134 in the inside enclosure 77. A compression spring 135 urges the balls into the notches 131 to hold the disc 115 against inadvertent rotation.

Rotation of the disc 115 is further limited by a pin 141 extending outwardly therefrom which cooperates with a stop member 142 (FIG. 8) secured to the inside enclosure 77. This prevents the operator from turning the disc 115 more than 345° in one direction and thereby prevents the wires connected to the coils L7-L9 from being torn loose.

The rotating disc 105, on the side facing coils L7-L9, include metallic segments 144 and 145. The segments 144 cooperate with coils L8 and L9 to form a waveform generator, the frequency of which is a function of the rotational speed of the motor. Metallic segment 145 cooperates with coil L7 to identify the needle-up position of the motor.

Reference is now made to FIG. 14 which is a block diagram of the different circuits employed in this invention. The motor 15 includes rotor position sensing means 150 which, as mentioned above, includes sensing coils L1-L4 cooperating with metallic segments 108 to provide commutation signals from position sensing circuit 155 to a sequence logic circuit 156 and coil drivers 157. The coil drivers supply current to the field windings in the motor at the appropriate time to cause the motor to rotate at the desired speed.

Also included within the motor are speed sensing means 152 including sensing coils L8 and L9 (which cooperate with metallic segments 144) and motor speed sensing coils L11 and L12 for providing inputs to a control logic circuit 160. This circuit receives command signals from the foot control 60 and provides the control signals necessary to position and motor either needle down or needle up, to cause the motor to stop through the dynamic brake 162, and to operate the cutter and tension solenoids through circuit 164. The power supplies 140 and 142 are also shown in block diagram form in FIG. 14.

Figure 15:
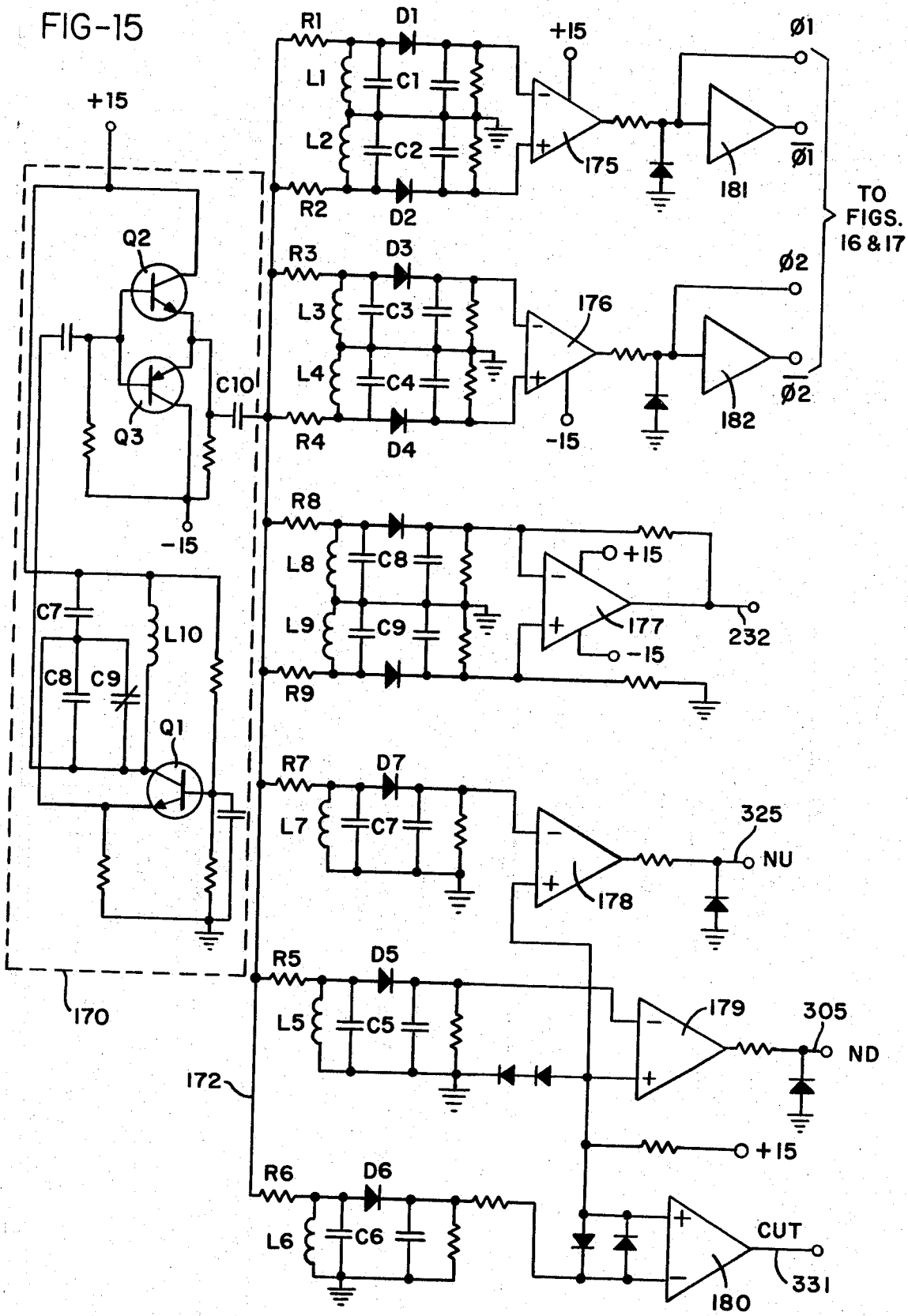
FIG. 15 is an electrical schematic diagram of the position sensing electronics.

Reference is now made to FIG. 15 which is an electrical diagram of the rotor position sensing electronics. The electronic circuitry used in this invention is similar to that circuit described in U.S. Pat. No. 3,714,532 in that sensing coils comprising part of resonant circuits are alternately tuned and detuned by metallic segments as these segments are rotated past the coils.

The sensing coils or inductors L1-L9 are supplied with a high frequency current from a fixed frequency oscillator circuit 170. The oscillator circuit is formed from an oscillator including transistor Q1, the frequency of which is determined by capacitors C7-C9 and inductor L10, and a complementary emitter follower circuit including transistors Q2 and Q3. The oscillator typically operates at a frequency of approximately 1 mHz.

The output of the oscillator circuit 170 is coupled through capacitor C10 to a common line 172 and through coupling resistors R1–R9 to the sensing coils. The sensing coils L1–L9 are tuned by means of capacitors C1–C9 to resonate at the oscillator frequency, preferably when the rotating metallic segment is not in position with respect to that sensing coil.

The voltage across the sensing coil will therefore depend on whether or not the metallic segment is positioned in proximity to that coil. The AC voltage appearing across each coil is rectified by diodes D1–D9. Diodes D1 and D2 are connected to a differential amplifier or direct current comparator device 175, and diodes D3 and D4 are connected to differential amplifier 176. Both of these differential amplifiers, in the embodiment of the invention shown, are Motorola type MC1709C operational amplifiers used as direct current comparators.

As described in the above mentioned patent, the use of complementary pairs of sensing coils or inductors provides for accurate switching of the current through the motor field windings while minimizing angular errors and rendering the output of the differential amplifier substantially independent of the frequency and magnitude of the excitation current provided by oscillator circuit 170.

The voltage across sensing coils L5, L6 and L7 are rectified by diodes D5, D6 and D7 and applied to amplifier circuits 178, 179 and 180, respectively. Sensing coil L5 senses the position of the motor rotor corresponding to the needle down position, coil L6 senses the position of the rotor at the cutter actuation position, and coil L7 is used to sense the position of the rotor corresponding to the needle up position.

Similarly, the voltage across sensing coils L8 and L9 is rectified by diodes D8 and D9, and this direct current potential is applied to differential amplifier 177. Coils L8 and L9 sense the pattern 144 on the rotor disc, and the output of amplifier 177 is an approximately sinusoidal waveform, the phase of which is used by the electronic circuitry to be described later for controlling the speed of the rotor.

Referring again to the motor commutation circuit, including sensing coils L1–L4, the direct output of amplifier 175 is identified as $\phi 1$. The direct output also passes through an inverter 181, the output of which is identified as $\overline{\phi 1}$. Similarly, the direct output of amplifier 176 is identified as $\phi 2$ while the output from inverter 182 is identified as $\overline{\phi 2}$. The four last mentioned outputs are used to control the current passing through the motor field windings, as will be explained.

Figure 17:
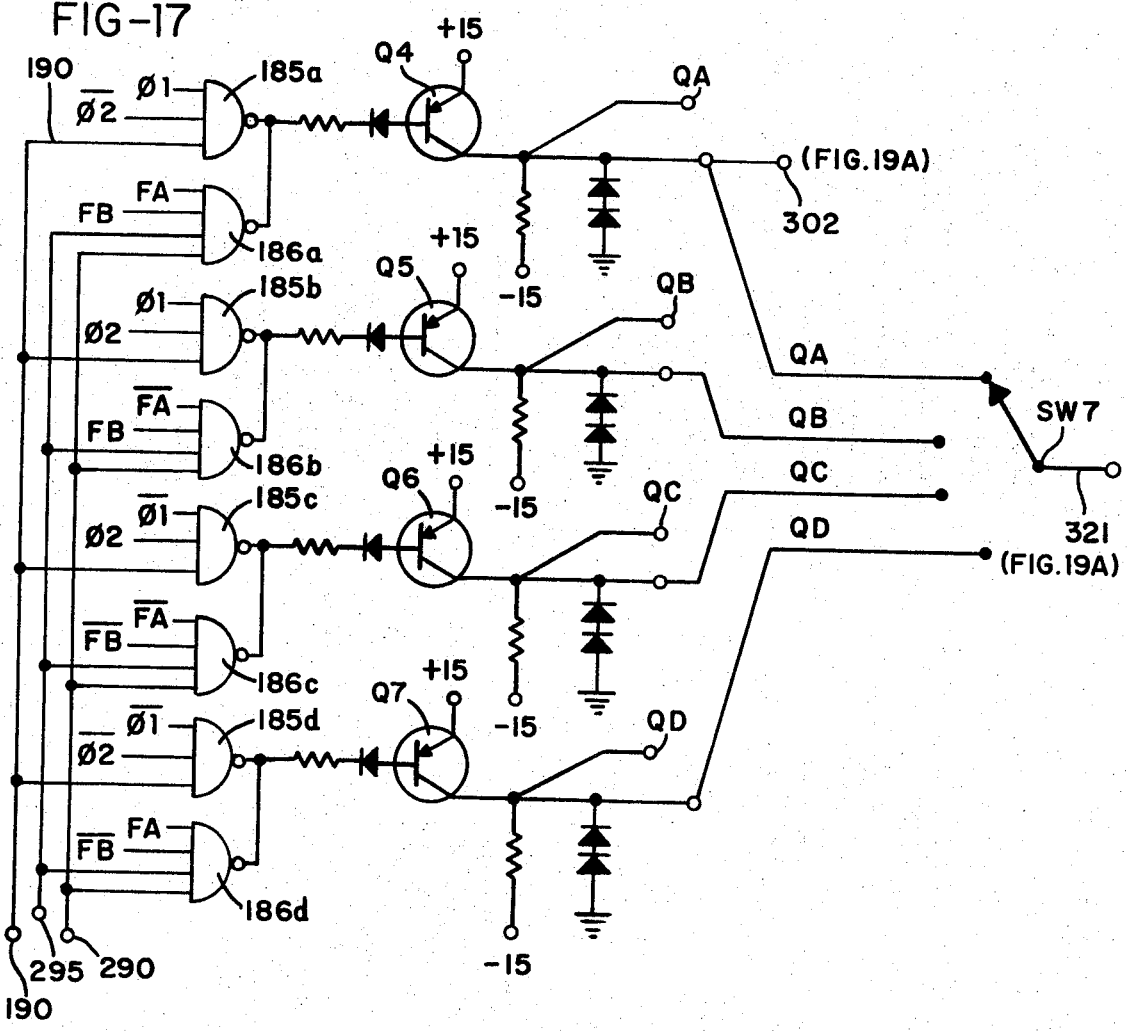
FIG. 17 is an electrical schematic diagram of a sequence gating logic circuit.

FIG. 17 is an electrical schematic diagram of a sequence gating logic circuit which is used to control the current through the field windings 80 of the motor 15. The gating circuit includes eight NAND gates, four of which (185a–185d are used when the motor is operating as a brushless DC motor, and the other four of which (186a–186d) are used when the motor is operating in the stepping mode. In the circuits hereinafter described, most of the components will be operated by signals which are either a logic "1" or a logic "0." The logic "1" is typically on the order of 15 volts DC, while logic "0" indicates that the circuit is connected to ground. A NAND gate requires all of its components to be at a logic "1" in order for its output to change from a logic "1" to a logic "0."

NAND gates 185a–185d each have three inputs, one of which is from a common enable line 190, and the other two inputs are connected to one of the outputs of amplifiers 175 or 176 or inverters 181 or 182. For example, the input to gate 185a is $\phi 1$, $\overline{\phi 2}$, and the common enable 190. When all of the inputs to gate 185a are logic "1," this will cause transistor Q4 to be gated into conduction. Similarly, transistors Q5, Q6 and Q7 will be gated into conduction in sequence under the control of the position sensing coils L1–L4.

The relationship between the metallic segments 108 and the rotor position sensing coils L1–L4 is such that a rotating magnetic field is created which leads the rotor field by an average of 90° which is the theoretical optimum torque angle.

Figure 3:
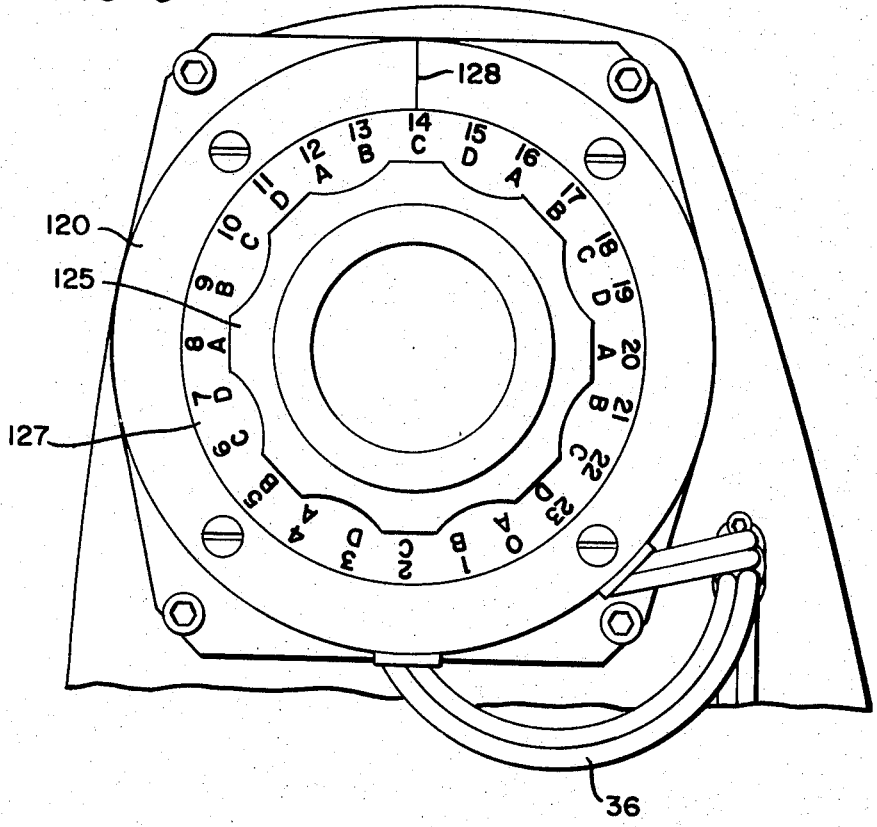
FIG. 3 is an enlarged end view of the motor showing particularly the needle-up position selector dial.
Figure 18:
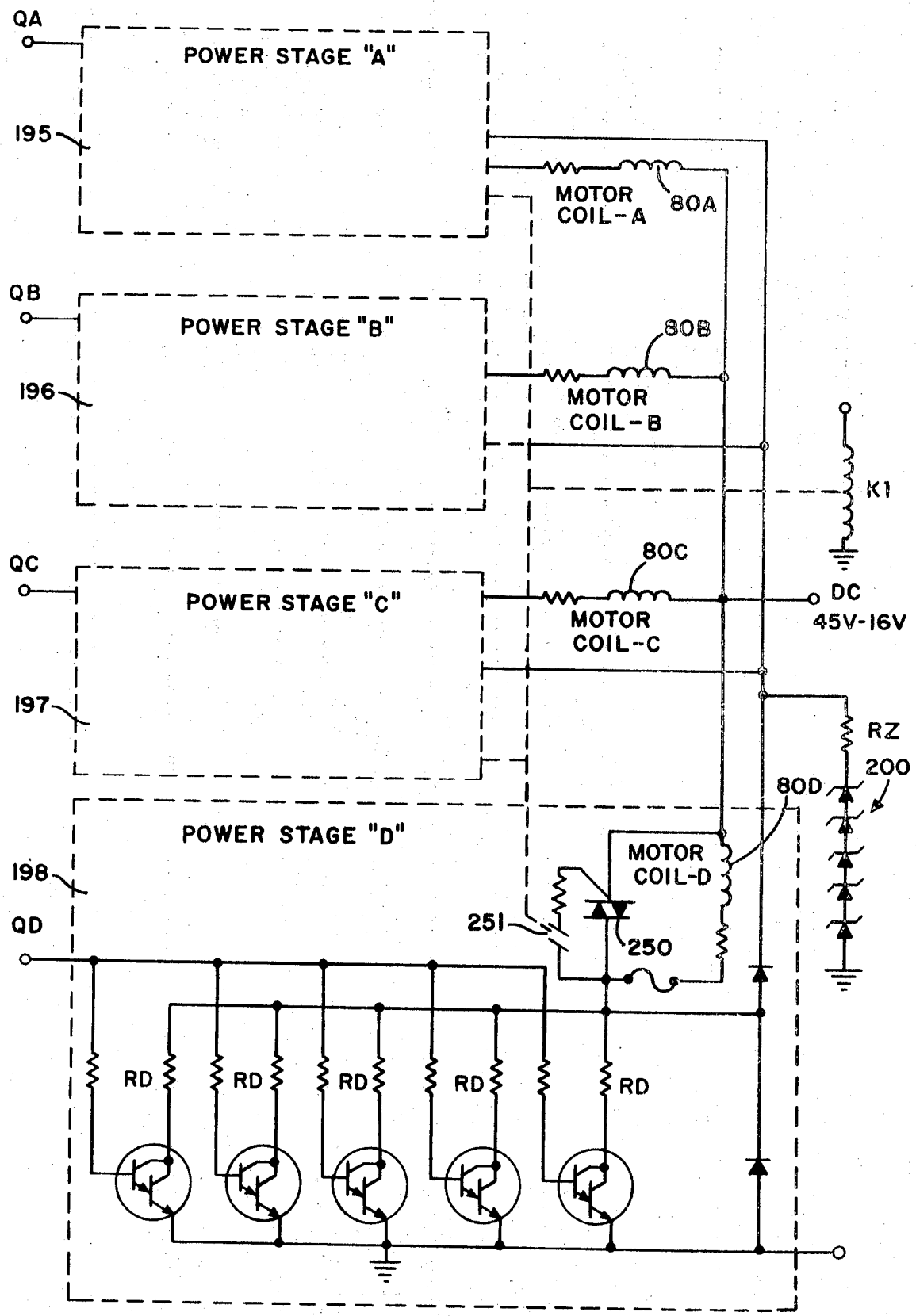
FIG. 18 is an electrical diagram of a field coil driver circuit and a dynamic braking circuit.

The outputs of transistors Q4–Q7 are identified in FIG. 17 as QA–QD, and these outputs are applied to the field coil driver circuit shown in FIG. 18. The outputs of these transistors are also applied to contacts of a selector switch SW7; the position of this switch is determined by selector 125 located on the motor housing. With reference to FIG. 3, the letter designations on the ring 127 correspond to these same letter designations on switch SW7.

Referring now to the field coil driver circuit shown in FIG. 18, the outputs QA–QD from the sequence gating logic circuit of FIG. 17 are applied to power driver circuits 195–198. The power drive circuit 198 is shown in detail and includes five Darlington power transistors connected in parallel. Output QD is connected to the gates of these transistors to control the current therethrough, and when these transistors are gated on, current will then flow through motor field winding 80D. Each Darlington transistor has in series therewith a resistor $R_D$ (approximately 2 ohms) for the purpose of dissipating motor power at a location remote from the motor windings and to cause the Darlington transistors to share current.

When the Darlington transistors are subsequently gated off, the energy stored as a magnetic field around the motor field winding is dissipated through a string of five Zener diodes 200 and resistor $R_Z$. The string of Zeners has a breakover voltage of 110 volts, thereby limiting the voltage on the collectors of the power transistors as the magnetic field in the motor field windings collapses.

The speed of the motor, when operated as a brushless direct current motor, is controlled by modulating the common enable line 190 (FIG. 17) which enables gates 185a–185d. The speed of the motor is thus controlled by controlling the average power supplied to the motor field windings.

Figure 19A:
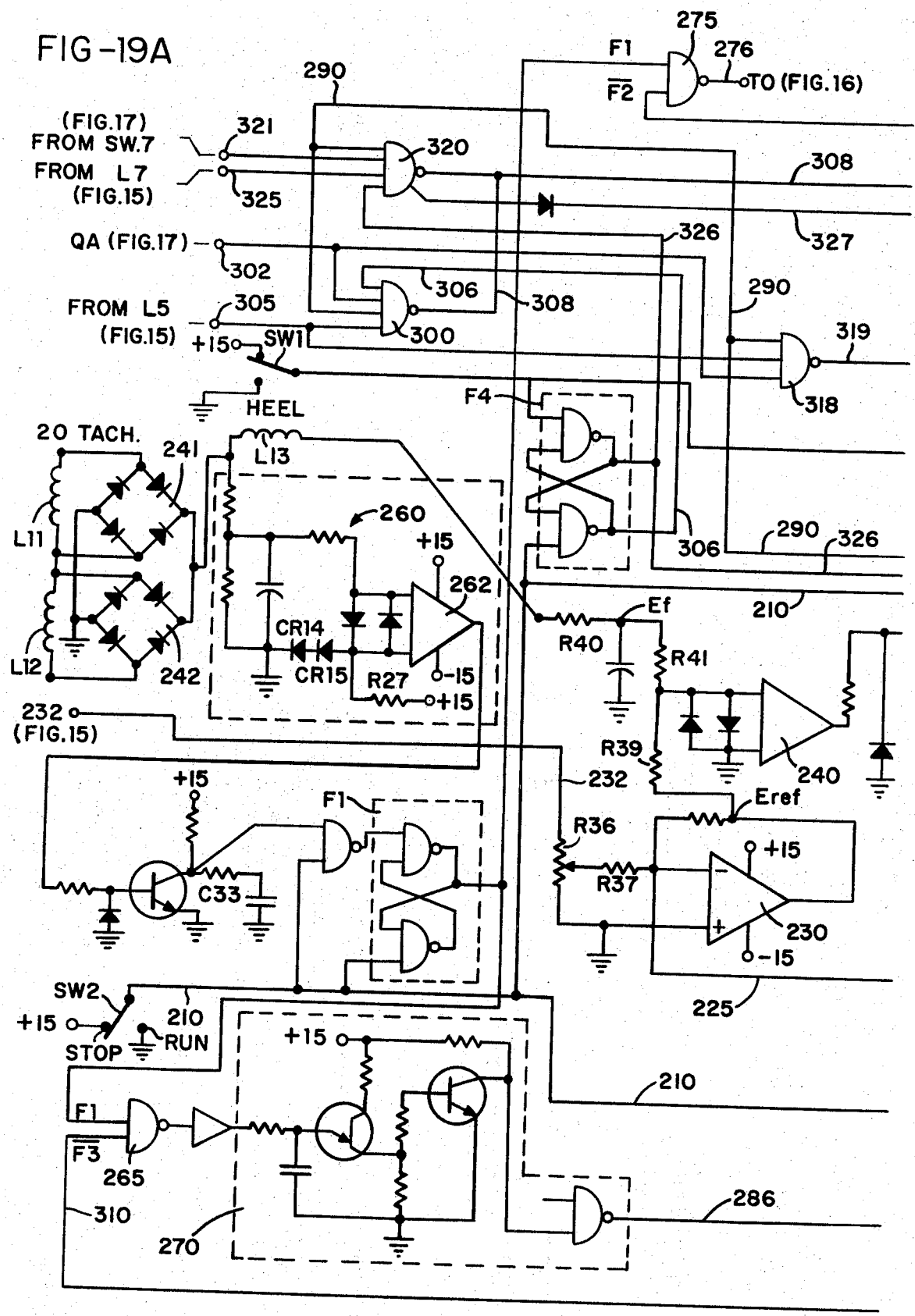
FIGS. 19A and 19B together are an electrical schematic diagram of the control logic.
Figure 19B:
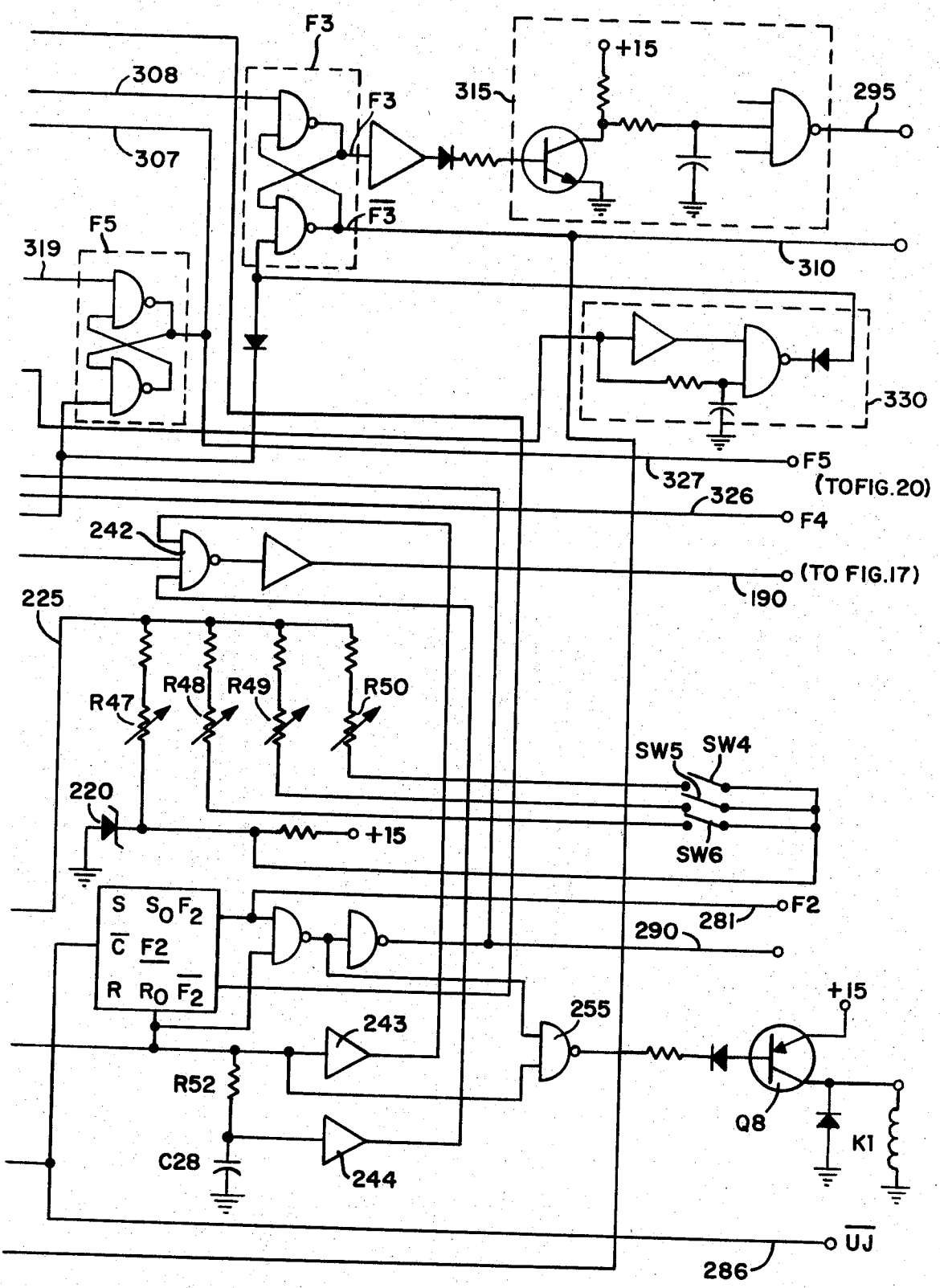

Referring now to FIGS. 19A and 19B, the speed of the motor is selected by switches SW4–SW6 located in the switch enclosure box 60. Switch SW2 (FIG. 19A), also located in the switch enclosure box, is closed and remains closed during the entire time the motor is operated in the brushless direct current mode. This switch is a single pole, double throw switch, and when in the run position, its output is a logic "0," and in the stop position its output is a logic "1." Anytime SW2 is in the run position, the motor will be programmed to run at least at the slowest of the four programmable speeds.

Switches SW4, SW5 and SW6 will close in sequence, and remain closed as the operator calls for higher motor speeds. A Zener diode 220 provides a substantially constant voltage directly to speed control resistors R48, R49 and R50. As the number of switches closed increases, the reference current into line 225 will also increase. The waveform generator, as previously described, provides a generally sinusoidal waveform output from amplifier 177, the phase of which is related to the position of the rotor with respect to the motor field windings at the adjustable arm of potentiometer R36. The current produced in R37 is summed with the reference current to determine the voltage output of amplifier 230.

The voltage output of summing amplifier 230 is represented by E ref, the waveform 233 in FIG. 21C.

The output of amplifier 230 is applied through resistor R39 to a second summing amplifier 240. The other input to this amplifier is a speed voltage E$f$ generated by coils L11 and L12 which are bifilar windings wound with the motor field windings 80. The voltage developed in these windings is a function of motor speed, and this voltage is converted to direct current by rectifiers 241 and 242 and applied to the summing amplifier 240 through choke L13 and resistors R40 and R41. Choke L13 dampens any tendency toward high frequency oscillations due to the coupling between the voltage windings L11 and L12 and the motor field windings 80.

The input to the summing amplifier 240 therefore will be positive, negative, or alternating depending upon the relative magnitudes of a speed command signal Eref (the output of amplifier 230), and the velocity feedback signal E$f$ (the voltage generated by windings L11 and L12).

Figure 21:
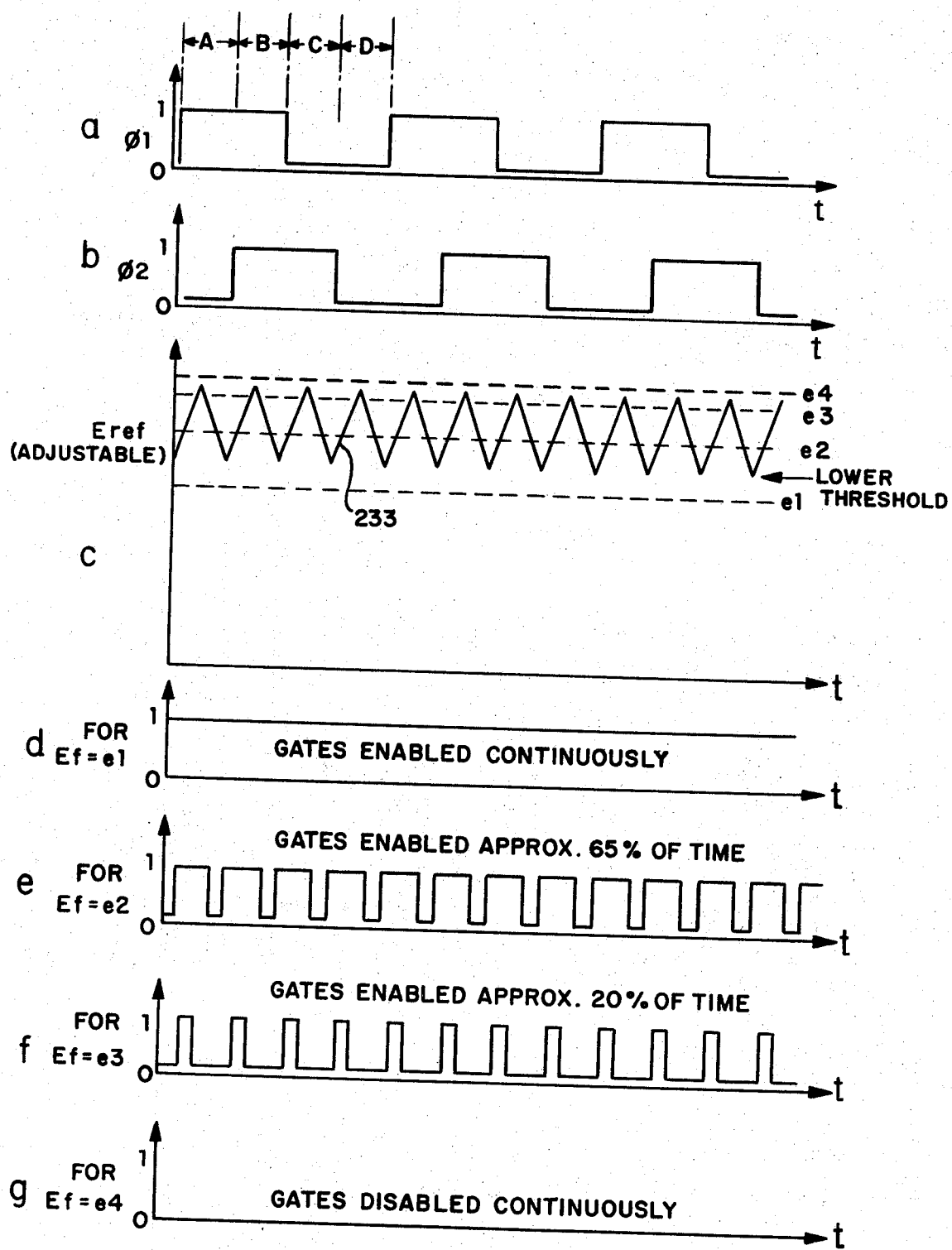
FIGS. 21a–21g are waveform diagrams showing the motor control function.

Referring again to FIG. 21, the horizontal dash lines ($e1$, $e2$, $e3$, $e4$) in FIG. 21c represents various velocity feedback signals. If the velocity feedback signal has a value $e1$, it will be noted that this value is lower than the excursion of the waveform 233, and therefore the output of summing amplifier 240 will be represented by FIG. 21d; that is, the output will cause the common enable line to be gated on continuously. As the velocity feedback signal increases to $e2$, the common enable line will be gated on approximately sixty-five percent of the time (FIG. 21e); as the velocity feedback signal increases to voltage $e3$, the common enable line will be gated on only approximately 20 percent of the time (FIG. 21f); and finally, if the velocity feedback signal rises to voltage $e4$ or above, the common enable line will not be gated on at all (FIG. 21g).

FIG. 21a is a waveform representing the output of amplifier 175 (FIG. 15), while FIG. 21b is a waveform representing the output of amplifier 176. The letters A, B, C and D in FIG. 21a represent the quadrants which may be developed from the waveforms of FIGS. 21a and 21b, and these are related in phase and frequency to the waveforms of FIGS. 21e and 21f.

Referring to FIGS. 19A and 19B, the output of summing amplifier 240 is actually applied to gate 242. This gate requires two other inputs. One input is derived from switch SW2 through inverter 243. The other input is also derived from switch SW2 through a delay circuit which includes resistor R52 and capacitor C28 and inverter 244. The output of inverter 244 is delayed by about thirty-five milliseconds to insure that power relay contacts are closed before there is a requirement for a high current to pass through these contacts, thereby protecting the contacts from damage.

In the power supply, a higher voltage is provided to the motor when the speed range called for by switches SW5 and SW6 are closed.

When the operator releases the foot pedal, the motor will decelerate and then be driven to a specified position in a stepping mode. To decelerate the motor quickly, the present invention utilizes dynamic braking by taking advantage of the generator action of the motor to create a reverse torque. Referring to FIG. 18, each power stage 195-198 includes triacs 250 mounted across the motor field windings. Each triac is controlled by reed relay contacts 251 which are closed by solenoid or reed relay K1. Reed relay coil K1 is also shown in FIG. 19B and is energized by current through transistor Q8 as controlled by gate 255.

Braking begins when switch SW2 is moved from the run to the stop position and lasts until the motor either stops, or its speed decreases sufficiently to start the stepping sequence.

The stepping sequence allows the motor to stop in one of two predetermined positions with a high degree of accuracy since the motor first is decelerated quickly from its running speed to a stop or at least to a slow, controlled speed which allows stopping of the motor at the position called for. In the present invention, the brushless direct current motor is operated as an open loop permanent magnet stepping motor by energizing the motor field windings sequentially. The stepping rate is controlled by an oscillator and is slow enough to allow stopping of the motor within the degree of accuracy necessary for the present use.

Motor speed is sensed, as described previously, by the voltage output from coils L11 and L12. This direct current voltage is applied to a voltage sensing circuit 260, and when the voltage output decreases below a threshold established by resistor R27 and diodes CR14 and CR15, amplifier 262 will provide an output to set flip-flop F1. Flip-flop F1 may be delayed in setting by the value of capacitor C33 which allows flexibility in choosing how nearly stopped the motor must be before the stepping mode begins.

Once flip-flop F1 is set, it enables gate 265 which in turn turns on a unijunction oscillator circuit 270. The first pulse output of this oscillator gates on flip-flop F2, and one of its outputs disables gate 255 to deenergize relay K1 and remove the braking action from the motor.

Figure 16:
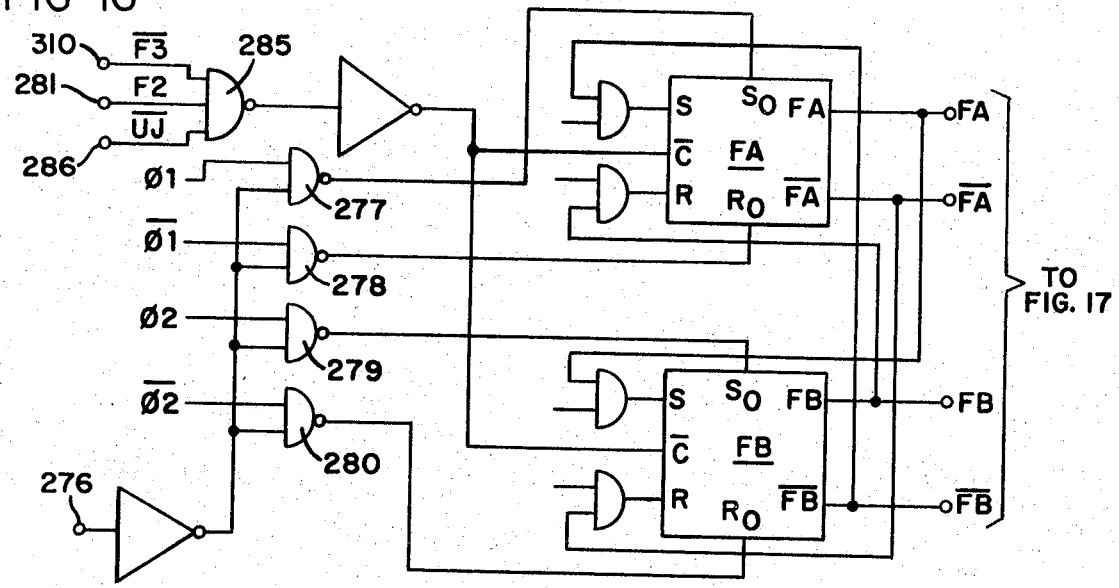
FIG. 16 is an electrical schematic diagram of a motor position register.

The output from flip-flop F1, when it sets indicating that the motor speed has decreased to a desired level, is also applied to enable gate 275. The other input to this gate is from flip-flop F2 which does not set until after the first pulse is generated by the oscillator 270. The output line 276 from gate 275 is applied as an enable to one input of NAND gates 277, 278, 279 and 280. The other input to these NAND gates is rotor position information from coils L1-L4 and causes flip-flops FA and FB (FIG. 16) to preset in accordance with actual rotor position. This is required to assure synchronization of the rotor with the advancing magnetic field during transition from the braking mode to the stepping mode.

When the first pulse from the unijunction transistor oscillator 270 is applied to flip-flop F2, this flip-flop will set on the trailing edge of that pulse, and the $\overline{F2}$ output will disable gate 275, the F2 on line 281 output will enable gate 285 (FIG. 16) and will allow the oscillator output $\overline{UJ}$ on line 286 to step flip-flops FA and FB as a sequence counter, starting with the second oscillator pulse.

The outputs of flip-flops FA and FB are quadrature square waves FA, $\overline{FA}$, FB, and $\overline{FB}$ similar to the waveforms $\phi 1$, $\overline{\phi 1}$, $\phi 2$ and $\overline{\phi 2}$. These are applied to NAND gates 186a–186d which operate in a manner similar to NAND gates 185a–185d when the motor was operating in the brushless direct current mode.

Gates 186a–186d each have two common inputs, a step enable input 290 from flip-flop F2, and a turn off delay input 295 from flip-flop F3, the operation of which will be described later.

The motor will step to one of two positions, depending upon the action of the operator, and then stop. If the operator merely releases the foot treadle and allows it to return to a neutral position, the motor will stop in the needle down position. If the operator heels the treadle, thereby closing switch SW1, then the motor will stop in the needle up position.

To stop in the needle down position, the operator merely releases the foot treadle and allows it to return to the neutral position thereby causing switch SW2 to move to the stop position. Gate 300 is operative to sense the conditions required for the motor to stop in the needle down position. This gate has four inputs, each of which must attain a logic "1" condition in order to terminate stepping pulses to the motor. One input is obtained from line 290 which indicates that flip-flop F2 is set and the system is operating in the step mode. Another input is on line 302 from the circuit shown in FIG. 17 and indicates when motor field winding 80A is energized. This assures precise positioning of the rotor when the motor is stopped.

A third input is obtained when sensing coil L5 detects the metallic segment 109, as indicated by an output from amplifier 179 on line 305. Finally, the fourth input on line 306 is obtained from flip-flop F4 which indicates that the treadle has not been heeled since the motor was operated in the run mode. As may be seen in FIG. 19A, flip-flop F4 is reset by an input on line 210 when switch SW2 was initially closed.

Once all four of the above conditions have been met, an output on line 308 is applied to set flip-flop F3. Flip-flop F3 was reset, also by switch SW2, when the motor was first operated in the run mode.

The $\overline{F3}$ output of flip-flop F3 on line 310 disables gate 265 and turns off the unijunction oscillator 270. This same output disables gate 285 (FIG. 16) to terminate the sequencing of flip-flops FA and FB, thus terminating the sequential application of current to the motor field windings. Finally, the F3 output of flip-flop F3 is applied through a delay circuit 315 to disable gates 186a–186d (FIG. 17).

Delay circuit 315 delays by approximately 0.6 seconds the removal of power from the motor field winding to allow the rotor to stabilize within the exact position called for.

Gate 318 has three inputs which also obtain a logic "1" condition when the motor reaches the needle down position, one from line 290, the second from line 302 and the third from line 305. An output on line 319 from gate 318 will cause flip-flop F5 to set at this time.

Thus, when the operator releases the treadle, stepping of the motor will cease once the motor rotor has reached the desired position, and power will be removed from the motor after the rotor has stabilized in the exact position called for.

The operator may cause the motor to stop in one of the preselected needle up positions by moving the treadle with his heel to close switch SW1. This may be done either while the machine continues to run or after the motor has stopped at the needle down position.

To stop the motor in the needle up position, five conditions must be met, and gate 320 senses the existence of all of these conditions. First, one input is obtained from line 290 which indicates flip-flop F2 is set and the system is operating in the step mode. Second, the correct motor field winding must be energized, as signified by a logic "1" on line 321 from switch SW7 (FIG. 17).

Switch SW7 is manually set to correspond with the letter designations on dial 127 (FIG. 3). It is contemplated, in other embodiments of the invention, that switch SW7 could be rotated at the same time as the knob 125 to insure exact correspondence between the position of the knob and the selection of the needle up position.

The third input to gate 320 is obtained when sensing coil L7 detects metallic segment 145 as indicated by an output from amplifier 178 on line 325. The fourth condition is a logic "1" on line 326 from flip-flop F4 which is set when the operator heels the treadle, thus closing switch SW1. The fifth condition is signified by an output on line 327 from flip-flop F5 which indicates that the motor has passed through the needle down position. As will be explained, in the preferred embodiment of the invention, it is required that the motor move through the needle down position to one of the selected needle up positions in order to complete a cut cycle.

One shot 330 causes flip-flop F3 to reset upon a heel command. Therefore, this flip-flop is set when the motor reaches the needle down position if the operator had not previously heeled the treadle, it is then reset if the operator subsequently heels the treadle to advance the motor to the needle up position, and then is set again when the needle up position is reached.

Once all of the inputs to gate 320 reach the logic "1" level, an output will be generated and transmitted on line 308 to set flip-flop F3 to cause the motor to cease stepping, as described above with reference to the needle down position.

Whenever the motor moves from the needle down position to the needle up position, a cut cycle will occur through the operation of the circuit shown in FIG. 20. This will cause the cutter and tension solenoids to be energized at the correct angular positions of the motor so that when the needle up position is finally reached, the thread will be cut and moved away from the material with the proper amount of thread extending from the needle. This cycle of operation may be defeated if the operator actuates the cut cycle defeat switch SW8 located on the front of the sewing machine stand.

Figure 22:
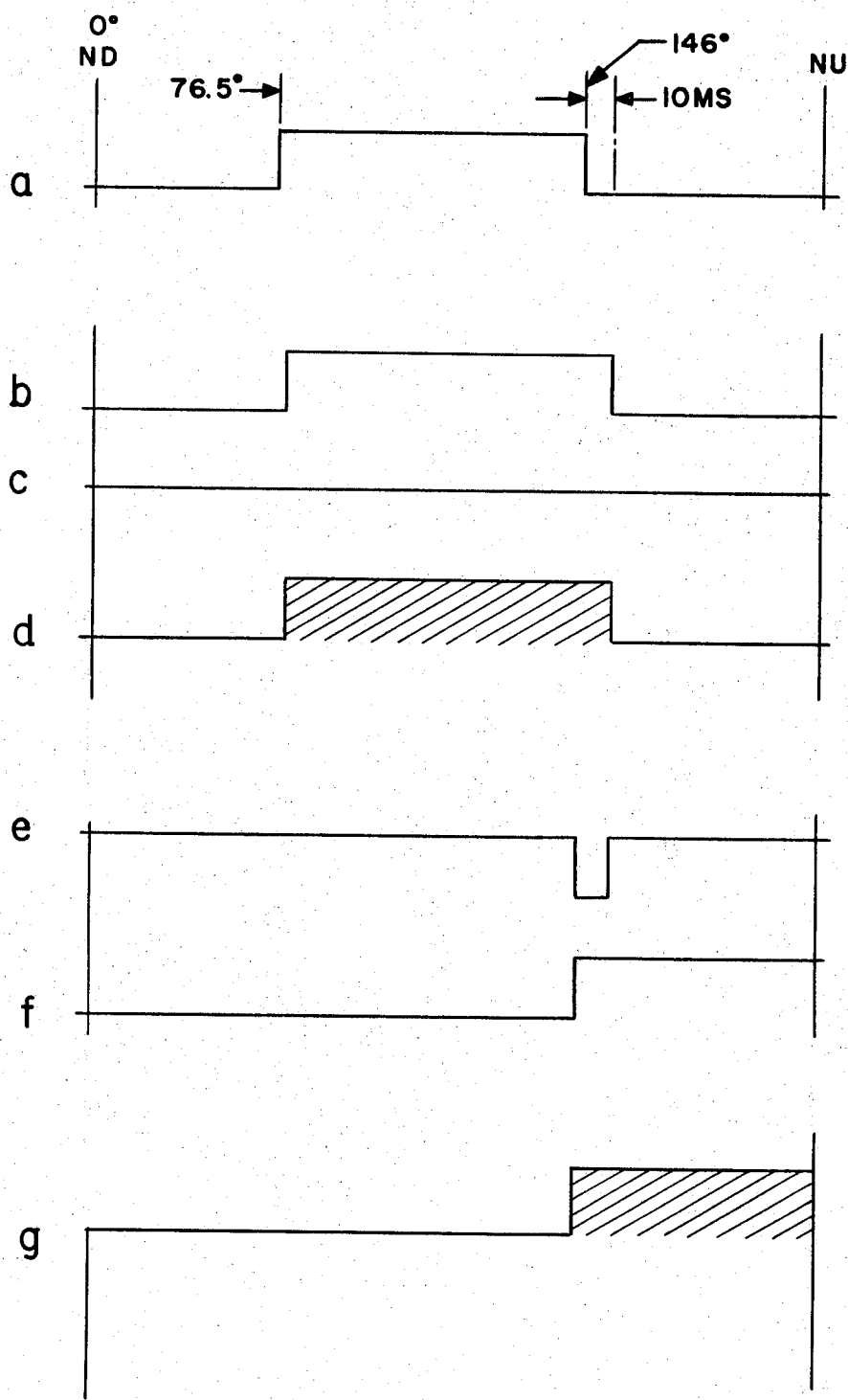
FIGS. 22a–22j are waveform diagrams illustrating the cut and tension functions.

A cut cycle signal is generated by metallic segment 110 as it passes in proximity to sensing coil L6. This generates an output from amplifier 180 on line 331 which is applied to delay circuit 332 and gate 335. The output waveform of amplifier 180 is shown in FIG. 22a while the output of the delay circuit 332 is shown in FIG. 22b with the trailing edge of the signal being delayed by ten milliseconds. The output of the delay circuit 332 is applied to gates 335 and 340.

A cut enable signal, shown in FIG. 22c, is generated on line 341 by the action of gate 345 which has two inputs, one on line 327 from flip-flop F5 (which is set when the motor passes through the needle down position) and the other on line 326 from flip-flop F4 (which is set by the closure of switch SW1 when the operator calls for the needle up position). The cut enable signal is applied to gates 340 and 350. The output of gate 340 is shown in FIG. 22d and is applied through a switch circuit 347 to energize the cut solenoid L14.

Diode CR49 and capacitor C29 are connected with the cut solenoid L14 to cause soft dropout as required for proper cutting operations.

Gate 335 generates an output which, along with the signal on line 341, is applied to gate 350, the output of which is a ten millisecond pulse shown in FIG. 22e, and this pulse sets flip-flop F6, the output being shown in FIG. 22f. The output of flip-flop F6, along with the signal on line 310 from flip-flop F3 is applied to a diode AND gate 335, the output of which is applied to switching circuit 360 which controls cirrent through the tension solenoid L15, as shown in FIG. 22g.

The tension solenoid is released immediately upon the setting of flip-flop F3 which occurs when the motor reaches the needle up position. Flip-flop F6 is reset by a signal on line 210 upon the closure of switch SW2 when the operator again depresses the treadle to start the motor for subsequent sewing operations.

While the form of apparatus herein described constitutes a preferred embodiment of the invention, it is to be understood that the invention is not limited to this precise form of apparatus, and that changes may be made therein without departing from the scope of the invention which is defined in the appended claims.

We claim:

1. A control system for a sewing machine to control the acceleration, driving, deceleration, and stopping position of the sewing machine needle in response to input signals from an operator actuated switch comprising, a brushless direct current motor having a plurality of field windings and a permanent magnet rotor, said rotor driving said sewing machine needle, means for sensing the angular position of said rotor, control means for controlling the energization of said motor field windings thereby to generate a rotating magnetic field, means for sensing the speed of said rotor, means for providing a reference signal representing the desired speed of said rotor, first circuit means responsive to said speed sensing means and to said reference signal for supplying signals to said control means to maintain the desired speed of said motor, second circuit means for dynamically braking said motor, third circuit means for supplying signals to said control means at a fixed rate, and means responsive to said operator actuated switch for selecting between the first, second and third means for operating said motor at a speed controlled by said first circuit means, thereafter to brake said motor, and then to step said motor to a predetermined rotor position.

2. A brushless direct current motor including
a permanent magnet rotor,
angularly spaced field windings surrounding said rotor,
first, second and third position indicating means mounted to rotate with said rotor,
first sensing means for sensing the passage of said first position indicating means, said first sensing means being fixed relative to said field windings,
second sensing means for sensing the passage of said second position indicating means, said second sensing means being fixed relative to said field windings,
third sensing means for sensing the passage of said third position indicating means, said third sensing means rotatably positionable with respect to said field windings, and
circuit means, in a first mode of operation, responsive to said first sensing means for controlling the current flow through said motor field windings in such a way as to cause said rotor to rotate; in a second mode of operation, responsive to said second sensing means for causing said rotor to stop at a fixed position relative to said field windings; and in a third mode of operation, responsive to said third sensing means for causing said rotor to stop at a selected, adjustable angular position with respect to said field windings.

3. The motor of claim 2 wherein said position indicating means include metallic segments mounted for rotation with said rotor and wherein said sensing means include inductors positioned in close proximity to said metallic segments, said motor further including means associated with each inductor to form a resonant circuit, said resonant circuit being alternately tuned and detuned by the passage of said metallic segments as the rotor rotates.

4. The motor of claim 3 wherein said resonant circuits are supplied with high frequency energy from a continuously running oscillator tuned to the frequency of said resonant circuits, said motor further including circuit means responsive to the voltage across one of the reactive elements in said resonant circuits to produce output signals responsive to the proximity of said metallic segments.

5. The motor of claim 2 wherein said circuit means includes
means responsive to said first sensing means for generating commutation signals,
field current supply means responsive to said commutation signals for controlling current through selected angularly spaced field windings to cause the magnetic field generated by said field windings to lead the magnetic field of the rotor by an average of 90°,
means for sensing the speed of rotation of said rotor,
means for providing a reference signal,
means for generating signals related to the position of said rotor, and
circuit means responsive to said speed sensing means, said reference signal and said rotor position signals for providing an output to said field current supply means to control the duration during which current is applied to said selected field windings thereby to maintain the speed of said rotor at a preselected speed as determined by said reference means.

6. A control system for a sewing machine to control the acceleration, driving, deceleration, and stopping position of the sewing machine needle in response to input signals from an operator actuated switch operable from a neutral position to one of a plurality of positions comprising,
- a brushless direct current motor having a plurality of field windings and a permanent magnetic rotor,
- means for sensing the speed of said rotor,
- means responsive to the position of said switch means for providing reference signals,
- circuit means responsive to said speed sensing means and to said reference signals for controlling the current to said field windings to maintain the speed of said rotor at the speed selected by said switch means,
- means responsive to said circuit means for dynamically braking said motor from its operating speed upon the return of said switch means to its neutral position, and
- means responsive to said circuit means for stepping said motor to a preselected angular position of the motor rotor after said rotor has been braked, and thereafter to stop said motor at the selected position.

7. The sewing machine control system of claim 6 wherein said switch means is a treadle mounted switch including a neutral position, a plurality of positions for selected motor speeds, and a heel position.

8. The sewing machine control system of claim 7 further including means responsive to said circuit means when said switch means has been moved to said heel position to cause said motor rotor to stop at a second, adjustable, preselected position.

9. The sewing machine control system of claim 6 wherein said stepping means includes
- an oscillator for supplying output pulses,
- means responsive to said output pulses for selectively energizing said motor field windings to create a rotating magnetic field, and
- means responsive to said rotor position sensing means for terminating the selective energization of said field windings when the rotor reaches the selected position.

10. The control system of claim 6 wherein said circuit means, in response to said rotor speed sensing means indicating that the rotor has slowed to a predetermined slow speed, causes the dynamic braking of said motor to be removed and said motor to start stepping to said preselected angular position.

11. A motor control system for use with a brushless direct current motor having a permanent magnet rotor and a plurality of angularly spaced field windings surrounding said rotor, said system comprising
- rotor position sensing means,
- first circuit means responsive to said rotor position sensing means for generating control signals which are related to the position of said rotor with respect to said field windings,
- second circuit means for generating control signals at a rate independent of said rotor position, and
- means for selecting between the control signals from said first or said second circuit means and for applying said control signals to energize sequentially said field windings thereby to produce a rotating magnetic field to cause said rotor to rotate.

12. The control system of claim 11 wherein said second circuit means includes
- an oscillator,
- a counter having an input from said oscillator and having an output which may be connected to energize sequentially said motor field windings, and
- means for presetting said counter in accordance with actual rotor position immediately prior to the selection of the control signals from said second circuit means.

13. In a motor control system, the combination including
- a brushless direct current motor having a plurality of field windings and a rotor,
- means for sensing the angular position of said rotor,
- means for sensing the speed of said rotor,
- means for providing a reference signal representing the desired speed of said rotor,
- circuit means responsive to said speed sensing means and to said reference signal for controlling the current to said field windings to maintain the desired speed of said rotor,
- means responsive to said circuit means for dynamically braking said rotor from its operating speed, and
- means responsive to said circuit means for stepping said motor to a preselected angular position of the motor rotor after said rotor has braked, and thereafter to stop said rotor at the selected position.

14. The motor control system of claim 13 wherein said circuit means controls the duration each field winding is energized to control the speed of said rotor.

* * * * *

PO-1050
(5/69)

UNITED STATES PATENT OFFICE
CERTIFICATE OF CORRECTION

Patent No. 3,832,613      Dated August 27, 1974

Inventor(s) Benjamin T. Bernstein, James R. Crawshaw and Morris H. McCurry

It is certified that error appears in the above-identified patent and that said Letters Patent are hereby corrected as shown below:

In the identifying data - [73]

ASSIGNEE: Change-Union Specially Machine Company-------
to------Union Special Corporation------------

Signed and sealed this 26th day of November 1974.

(SEAL)
Attest:

McCOY M. GIBSON JR.
Attesting Officer

C. MARSHALL DANN
Commissioner of Patents